United States Patent [19]

Richter

[11] 4,398,659

[45] Aug. 16, 1983

[54] METAL-COMPOSITE BONDING

[75] Inventor: Mark A. Richter, West Palm Beach, Fla.

[73] Assignee: United Technologies Corporation, Hartford, Conn.

[21] Appl. No.: 338,824

[22] Filed: Jan. 11, 1982

Related U.S. Application Data

[62] Division of Ser. No. 215,281, Dec. 12, 1980, Pat. No. 4,358,512.

[51] Int. Cl.³ .................... C03C 27/02; C03C 27/04; B32B 17/06
[52] U.S. Cl. .................... 228/124; 156/306.6; 156/307.7; 156/308.2; 156/325; 156/182; 228/121; 428/367; 428/433; 428/426
[58] Field of Search ............. 428/336, 334, 335, 367, 428/389, 390, 426, 428, 902, 663, 666, 672, 630, 631, 939, 433; 156/306.6, 182, 307.7, 308.2, 325; 228/121, 122, 124

[56] References Cited

U.S. PATENT DOCUMENTS

| | | | |
|---|---|---|---|
| 2,139,431 | 12/1938 | Vatter | 113/112 |
| 3,010,188 | 11/1961 | Bol et al. | 29/180 |
| 3,097,931 | 7/1963 | Davidson et al. | 29/195 |
| 3,249,408 | 5/1966 | Marafioti | 29/195 |
| 3,293,065 | 12/1966 | Roetter | 117/46 |
| 3,460,987 | 8/1969 | McMillian | 117/219 |
| 3,624,894 | 12/1971 | Miller | 228/121 |
| 3,857,161 | 12/1974 | Hutchins | 228/121 |
| 3,878,425 | 4/1975 | Katz | 313/352 |
| 3,888,661 | 6/1975 | Levitt | 75/201 |
| 3,921,885 | 12/1975 | Knox | 228/121 |
| 4,018,374 | 4/1977 | Lee | 228/121 |
| 4,033,668 | 7/1977 | Presby | 350/96 |
| 4,263,367 | 4/1981 | Prewo | 428/338 |
| 4,265,968 | 5/1981 | Prewo | 428/336 |
| 4,277,716 | 7/1981 | Banks, Jr. | 428/433 |

*Primary Examiner*—Ellis P. Robinson
*Attorney, Agent, or Firm*—Harry J. Gwinnell

[57] ABSTRACT

A method of bonding a graphite fiber reinforced glass matrix composite to a metal structure comprising depositing a layer of eutectic alloy metal component to the bond surfaces of the metal and composite followed by placing the thus treated bond surfaces of the metal and composite together with a layer of eutectic alloy containing such metal therebetween. The metal-bond-composite is then heated to melt the alloy and bond the composite to the metal. Articles formed by such a process are also described. The method has particular utility in bonding cooling channel containing metal bases to graphite-glass composite laser mirrors.

7 Claims, 1 Drawing Figure

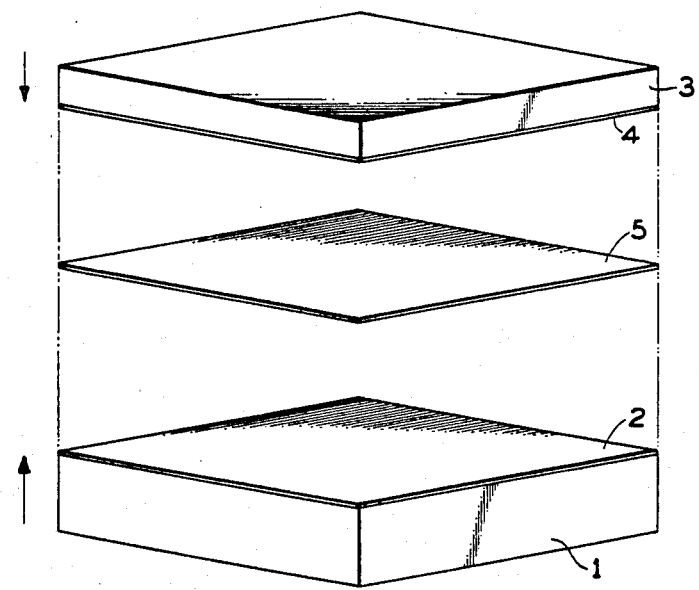

4,398,659

METAL-COMPOSITE BONDING

This is a division of application Ser. No. 215,281 filed Dec. 12, 1980 now U.S. Pat. No. 4,358,512.

CROSS REFERENCE TO RELATED APPLICATIONS

Attention is directed to commonly assigned, copending U.S. patent applications: Ser. No. 215,282, filed Dec. 12, 1980 now U.S. Pat. No. 4,353,966 which disclosed a method of bonding graphite fiber reinforced glass matrix material; and Ser. No. 215,283, filed Dec. 12, 1980 now U.S. Pat. No. 4,350,774 which discloses a method of bonding graphite fiber reinforced glass.

DESCRIPTION

1. Technical Field

The field of art to which this invention petains is metal bonding and specifically metal bonding of composite materials.

2. Background Art

A new class of composite materials has recently appeared in the composite art. This new material is graphite fiber reinforced glass. This new material, as described in commonly assigned copending U.S. Pat. Applications Ser. Nos. 54,098, filed July 2, 1979 now abandoned; 92,168, filed Nov. 7, 1979 now U.S. Pat. No. 4,263,367; and 135,375, filed Mar. 28, 1980 now U.S. Pat. No. 4,265,968, has many improved properties such as thermal conductivity, flexural strength, impact resistance, and thermal stability. These materials are generally hot pressed as an admixture of graphite fibers of particular fiber orientation in particulate glass. Therefore, there is generally little difficulty in forming this material in any desired shape prior to hot pressing. Furthermore, it is also possible to hot press the intermediately formed composite into the desired design shape. However, for some applications it is necessary to bond various pieces of these preformed, hot pressed composite materials to metal pieces. Attempts at using conventional bonding materials such as epoxy, while meeting with limited success are not compatible with the high temperature use these composite materials are primarily designed for and particularly adapted to, although for some less stenuous applications, conventional adhesives could be quite acceptable.

Particular problems occur in attempts to bond laser mirror substrates made of such composite materials to metal parts or assemblies such as metal heat exchangers. Because of the temperature gradients such metal-composite bonds undergo in operation of such mirrors, it is difficult to get a bond material of sufficient strength and adhesion to withstand this use.

Accordingly, what is needed in this art is a bonding method for fiber reinforced composites and specifically graphite reinforced glass matrix composites which provides a bond which maintains the strength and thermal properties of the composite, especially when bonded to a metal substrate.

DISCLOSURE OF INVENTION

The present invention is directed to a method of bonding a graphite fiber reinforced glass matrix composite of high temperature strength and high thermal stability to a metal substrate comprising applying thin layers of a eutectic alloy metal component to the bond surface of the metal and the bond surface of the composite followed by inserting a layer of eutectic alloy containing the deposited metal between the metal substrate and composite followed by raising the temperature of the metal-bond-composite to melt the alloy and bond the composite to the metal.

Another aspect of the invention includes bonded metal-composite articles made according to the above recited process.

The foregoing, and other features and advantages of the present invention, will become more apparent from the following description and accompanying drawing.

BRIEF DESCRIPTION OF THE DRAWING

The FIGURE demonstrates a bonding process according to the present invention.

BEST MODE FOR CARRYING OUT THE INVENTION

Before bonding the graphite fiber reinforced glass matrix composite pieces to the metal pieces according to the present invention, the pieces are preferably cleaned. Conventional cleaning methods can be used such as ultrasonic cleaning in methanol followed by heating. The pieces can also be placed in a cathode sputtering apparatus and sputtered clean. As is conventional in the bonding art, the cleaner the surfaces, the better the bond.

The eutectic alloy metal component is next deposited both on the composite bond surface and the metal bond surface. While any conventional method of depositing a thin layer of the metals may be used, e.g. plating or vapor deposition, cathode sputtering is preferred. The metals are preferably deposited in thin layers, for example, less than 25 microns. The eutectic alloy intermediate layer may be applied as a coating directly on either the coated metal, coated composite or both, or may be simply inserted between the metal and composite as a thin foil, wire, ribbon, etc. If the foil form is used, it is generally from 10 to 50 microns thick.

By eutectic alloy metal component is meant a free metal commonly used in admixture with at least one other free metal which admixture has typical eutectic melting properties, i.e. acts as a solder or braze. For example, if gold is used a tin-gold eutectic alloy can be used as the bonding eutectic alloy, and similarly if nickel, copper, silver, gold, chromium, nichrome, etc. are used as the eutectic alloy metal component, admixtures of these metals with their conventional eutectic alloying metals are also used. Note *Constitution of Binary Alloys* by Hanson (Second Edition, McGraw-Hill Pub. Co., 1958) for a disclosure of such conventional alloys.

After application of all of the metal layers and eutectic alloy the metal component, bonding alloy, and composite are laid one on top of the other and subjected to a slight pressing, e.g. 2 to 15 psi ($1.4 \times 10^4$ to $10.3 \times 10^4$ NT/M$^2$) and the composite-bond-metal heated to a temperature sufficient to melt the bonding alloy. While this heating may take place in air, improved bonding results if the heating is performed in a non-oxidizing or even reducing atmosphere such as argon or hydrogen. Similarly, while the heating may be performed at atmospheric pressure, it may be performed under vaccum as well. For example, a piece of molybdenum metal and graphite fiber reinforced glass matrix material are ground flat to substantially matching contours and cleaned. Gold layers approximately one micron thick are then deposited by cathode sputtering onto the cleaned and bond surfaces of both the metal and the composite. A gold-tin eutectic alloy in foil form approximately 25 microns thick is then inserted between the coated metal and composite pieces to be bonded. The pieces are stacked, bond surfaces together as shown in the FIGURE, where 1 is the graphite fiber reinforced glass matrix composite, 3 molybdenum metal, 2 and 4 the deposited gold layers, and 5 the 80% by weight gold, 20% by weight tin eutectic alloy foil. A pressure of approximately 2 to 15 psi ($1.4 \times 10^4$ to $10.3 \times 10^4$ $NT/M^2$) is then applied to the composite-bond-metal material and the temperature raised to about 280° C. The samples were tested in a tensile test with a bond area of 0.3 in.$^2$ (1.94 cm$^2$) and resulting bonded material was found to have a bond strength of at least 2800 psi ($1.9 \times 10^7$ $NT/M^2$).

While this bonding process has been described for graphite fiber reinforced glass composites, the process according to the present invention may be used for any fiber reinforced glass or glass-ceramic or ceramic composite. Specifically, the process is designed for bonding those composites disclosed in commonly assigned copending U.S. patent applications Ser. Nos. 54,098, filed July 2, 1979; 92,168, filed Nov. 7, 1979; and 135,375, filed Mar. 28, 1980, the disclosures of which are incorporated by reference.

As described in the above patent applications, while any graphite fiber with the requisite high strength and good modulus of elasticity can be used in the composites of this invention, such as Hercules HMS graphite fiber, Celanese GY-70 (formerly DG102) graphite fibers are particularly suitable. This fiber consists of 384 fibers/tow and has an oxidized finish. It is 8 microns in diameter, has a modulus of elasticity of 531 GPa ($77 \times 10^6$ psi). It has a tensile strength of 1724 MPa ($250 \times 10^3$ psi) and a density of 1.96 gm/cm$^3$. The fiber is used at about 40% to 70% by volume based on the graphite-glass composite and preferably at about 60% by volume. Also, as described in these applications, the glass used in the composites of the present invention is particularly selected to have a very low coefficient of thermal expansion preferably matched closely, but not equal to that of the graphite fibers used since the graphite has a highly negative axial coefficient of thermal expansion, and the glass has a positive but small coefficient of thermal expansion. Particularly suitable for the purposes of this invention is a borosilicate glass (Corning Glass Works 7740) with an anneal point of 500° C., a softening point of 821° C., a liquidus temperature of 1017° C., a density of 2.23 grams per cubic centimeter, an index of refraction of 1.474, a dielectric constant of 4.6, a coefficient of linear expansion of 32.5 cm/cm°C.$\times 10^{-7}$ and a modulus of elasticity of $9.1 \times 10^6$ psi ($6.3 \times 10^7$ $NT/M^2$). The particle size of the glass should be such that at least 90% passes through a 36.0 mesh screen.

The main advantage of the bonding material of the present invention is that it allows fabrication and flexibility in design of the graphite reinforced glass composites described in the above recited patent applications without sacrifice in the improved strength, impact resistance and thermal stability of the composite material.

For example, the resulting bond between composite pieces has stability over a wide range of temperature conditions. The bond strengths in excess of 2800 pounds per square inch ($1.9 \times 10^7$ $NT/M^2$) are significant for any bonding material excluding the difficult bondability of the graphite fiber reinforced glass composites of the present invention.

One area of particularly important utility for this method is with composite laser mirrors as described in copending U.S. patent application Ser. No. 54,098, filed July 2, 1979, the disclosure of which is incorporated by reference. A conventional use for these mirrors is in conjunction with a metal face plate or heat exchanger such as a molybdenum block containing cooling channels. It has been difficult to find bonding agents which will hold such a metal-composite mirror together without degrading the properties of the composite. However, utilizing the process according to the present invention, a molybdenum metal faced graphite fiber reinforced glass composite mirror can be made without excellent bond strength.

Although this invention has been shown and described with respect to detailed embodiments thereof, it will be understood by those skilled in the art that various changes in form and detail thereof may be made without departing from the spirit and scope of the claimed invention.

I claim:

1. A method of bonding a high strength, thermally stable, graphite fiber reinforced glass matrix composite to a metal surface, the glass matrix having a low coefficient of thermal expansion and the graphite fiber having a highly negative axial coefficient of thermal expansion comprising depositing a thin layer of a eutectic alloy metal component to the bond surfaces of the composite and the metal, inserting a thin layer of eutectic alloy containing the metal component between the bond surfaces, placing the metal and composite bond surfaces together with the eutectic alloy in between and raising the temperature of the metal-alloy-composite to a temperature sufficient to melt the alloy and bond the composite.

2. The method of claim 1 wherein the metal component layers are deposited in thicknesses up to 25 microns.

3. The method of claim 1 wherein the bond produced has a strength of at least 2800 psi ($1.9 \times 10^7$ $NT/M^2$).

4. The method of claim 1 wherein the graphite fibers have a modulus of elasticity of at least 531 GPa, a tensile strength of at least 1724 MPa and a density of about 1.96 gm/cm$^3$.

5. The method of claim 1 wherein the composite contains 40% to 70% by volume graphite fibers having orientation in the composite of 0° and 90°; 0°, 45° and 90°; 0°, 60° and 120°; are discontinuous; or have fiber orientation substantially perpendicular to the bond.

6. The method of claim 1 wherein the metal surface is molybdenum.

7. The method of claim 1 wherein the eutectic alloy metal component is gold and the eutectic alloy is a gold-tin mixture.

* * * * *